United States Patent [19]

Okane et al.

[11] 4,308,446

[45] Dec. 29, 1981

[54] METHOD AND APPARATUS FOR REMOVING BURRS FROM PRODUCTS FABRICATED FROM METAL STOCK

[75] Inventors: Isao Okane, Higashikurume; Sadao Fukushima, Hachioji; Kinji Tanuma, Kawasaki, all of Japan

[73] Assignee: National Research Institute for Metals, Tokyo, Japan

[21] Appl. No.: 118,218

[22] Filed: Feb. 4, 1980

Related U.S. Application Data

[63] Continuation of Ser. No. 884,394, Mar. 8, 1976, abandoned.

[30] Foreign Application Priority Data

Mar. 23, 1977 [JP]  Japan .................................. 52-31114
Dec. 19, 1977 [JP]  Japan ................................. 52-151821

[51] Int. Cl.³ .............................................. B23K 9/08
[52] U.S. Cl. ...................................... 219/123; 219/61; 219/60 R; 228/125
[58] Field of Search .......... 219/123, 121 PA, 121 PB, 219/61, 60 R, 59.1, 101; 228/163, 125

[56] References Cited

U.S. PATENT DOCUMENTS 3,352,997  11/1967  Butler ................................... 219/123
3,689,740  9/1972   DeCorso et al. .................... 219/123
3,902,035  8/1975   Broodman .......................... 219/101
4,035,604  7/1977   Meleka et al. ................. 219/121 PB

FOREIGN PATENT DOCUMENTS 46-1841  1/1971  Japan ................................... 228/125

Primary Examiner—C. C. Shaw
Attorney, Agent, or Firm—Wenderoth, Lind & Ponack

[57] ABSTRACT

A method and an apparatus for clearing burrs from products fabricated from metal stock. The burr of a product is used as one electrode, and another electrode is formed by extending an electrode material along, and apart from, the burr. A voltage is applied across the electrode to generate an arc between them. In the meanwhile, a magnetic field having a magnetic flux flow crossing the arc is formed to drive the arc along the burr by an electromagnetic force whereby the burr is melted and removed from the product.

17 Claims, 4 Drawing Figures

METHOD AND APPARATUS FOR REMOVING BURRS FROM PRODUCTS FABRICATED FROM METAL STOCK

This is a continuation of application Ser. No. 884,394, filed Mar. 8, 1976, now abandoned.

FIELD OF THE INVENTION

This invention relates to a method and an apparatus for removing burrs from products fabricated from metal stock, and more specifically, to a method and an apparatus for melting and removing such a burr by utilizing an arc.

The term "burr", as used in the present application, denotes a thin ridge or area of roughness which is produced in fabricating metal stock, and which is required or desired to be cleared finally from the fabricated product. It is customarily so used in a shearing process, and is generally expressed as "flash" or "fin" in a forging process, a welding process and a casting process. It should be understood therefore that in the present application, the term "burr" is meant to include all these and other terms which denote such a ridge or area in fabricated metal products.

DESCRIPTION OF THE PRIOR ART

It is well known that when a metal material is fabricated by plastic working (e.g., forging, drawing), shearing, casting, or welding, burrs are produced at the edges, ends, joints, etc. of the products. These burrs are required or desired to be removed finally from the products because they are functionally useless and impair the appearance of the products.

According to the conventional practice, the burrs are cleared from the products by a mechanical process such as grinding by a grinder or cutting by a lathe, or by melting them with a gas flame. The conventional burr removing methods, however, have one or more disadvantages. For example, a relatively long period of time is required for the burr removing operation, or the burr removing operation is complicated. Also, considerable noises and dusts may be caused at the time of the burr removing operation to worsen the working environment.

SUMMARY OF THE INVENTION

It is an object of this invention to provide a novel method and a novel apparatus for removing burrs, which are free from the aforesaid defects.

Another object of this invention is to provide a method and an apparatus by which burrs can be removed from fabricated metal products within a very short period of time.

Still another object of this invention is to provide a method and an apparatus by which burrs can be removed from fabricated metal products as desired without damaging the products.

According to this invention, there is provided a method for melting and removing a burr formed on a product fabricated from metal stock, which comprises generating an arc between the burr as one electrode and another electrode composed of an electrode material extending along, and spaced from, the burr; and forming a magnetic field having a magnetic flux flow crossing the arc thereby to drive the arc along the burr by an electromagnetic force.

The present invention also provides an apparatus for melting and removing a burr formed on a product fabricated from metal stock, comprising an electrode material extending along, and spaced from, the burr; a power source for applying a voltage across the burr and the electrode material to generate an arc between them; and means for forming a magnetic field having a magnetic flux flow crossing the arc thereby to drive the arc along the burr by an electromagnetic force.

These and other objects and advantages of the present invention will become more apparent from the following description taken in conjunction with the accompanying drawings.

BRIEF DESCRIPTION OF THE ACCOMPANYING DRAWINGS

DETAILED DESCRIPTION OF PREFERRED EMBODIMENTS

Figure 1:
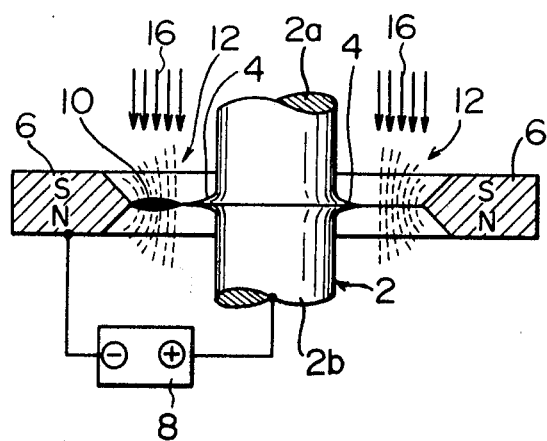
FIG. 1 is a simplified sectional view showing one embodiment of the burr removing apparatus in accordance with this invention.
Figure 2:
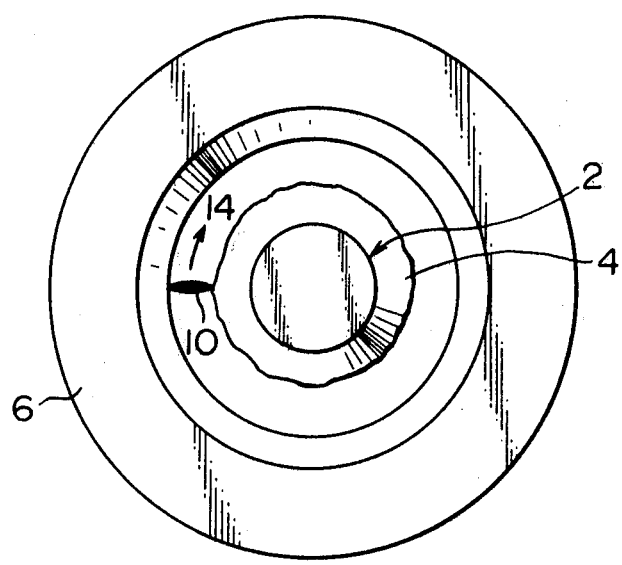
FIG. 2 is a simplified top plan of the embodiment shown in FIG. 1.

Referring to FIGS. 1 and 2, a product 2 obtained by welding the ends of, for example, cylindrical metal materials 2a and 2b by a butt welding technique has an annular flash (i.e., burr) 4 extending along the peripheral surface of the weld joint. In removing the flash 4 of the product 2 by the present invention, the product 2 is disposed within an annular electrode material 6 so that the electrode material 6 surrounds the flash 4 and its inner surface extends along the flash 4 at a predetermined distance from the flash 4. Then, a voltage is applied across the product 2 and the electrode material 6 by a suitable power source 8 connected to the product 2 and the electrode material 6. As a result, the flash 4 acts as one electrode, and the electrode material 6 acts as the other electrode, and an arc 10 is generated between then at one or more positions at which these electrodes are closest to each other (i.e., between at least one part of the flash 4 which is most protruding and the corresponding part of the electrode material 6). When a magnetic field having a magnetic flux flow 12 is formed which crosses the arc 10, preferably crosses it substantially at right angles to it, an electromagnetic force is generated in accordance with the Fleming's left hand rule. The action of the resulting electromagnetic force drives the arc 10, for example in the direction of arrow 14, and thus turns it along the annular space between the electrode material 6 and the flash 4. The flash 4 is thus progressively melted by the heat generated by the arc 10, and is removed from the product 2 very rapidly (for example, within several seconds).

The arc 10 generated between the electrode material 6 and the flash 4 may be of an alternate current or a direct current, but preferably it is of a direct current. In the case of a DC arc, the arc can be continuously driven in a predetermined direction by merely forming a magnetic field having a magnetic flux crossing the arc. On the other hand, to drive an AC arc continuously in a predetermined direction, the direction of the magnetic flux flow of the magnetic field must be changed synchronously with the phase of the AC arc current to maintain the two in a prescribed relation.

In order to generate a DC arc between the electrode material 6 and the flash 4, it is preferred to use the electrode material 6 as a negative electrode and the flash 4 as a positive electrode. As is known to those skilled in the art, when a DC arc is generated between a pair of electrodes, the negative electrode is at a relatively low temperature, and the positive electrode is at a relatively high temperature. In this preferred aspect, therefore, the electrode material 6 as the negative electrode is at a relatively low temperature and the flash 4 as the positive electrode is at a relatively high temperature. As a result, the damage of the electrode material 6 by heat is inhibited and the electrode material 6 has a longer life. The flash 4, on the other hand, can be melted at a better melting efficiency.

It is important that the shape of the electrode material 6 conforms to the shape of flash 4 to be removed, and the electrode material 6 extends along the flash 4 in a spaced-apart relation from it. In FIGS. 1 and 2, the flash 4 to be melted and removed is annular, and the electrode material 6 is correspondingly annular. If the burr is of a straight line extending along one edge of a rectangular-parallelpipedal metal product, the electrode material may be a narrow strip of material which extends along, and apart from, the burr. If the electrode material and the burr are not endless as in this case, the arc formed between them can be driven such that it reciprocates along the burr.

Preferably, that side of the electrode material 6 which faces the flash 4 is tapered as shown in FIG. 1, and an arc is generated concentratingly between this tapered end and the flash 4.

The magnitude of the arc current formed between the electrode material 6 and the flash 4 can be selected as desired according to the material, size, shape, etc. of the flash to be melted and removed. Generally, an arc current within the range of 100 A to 10,000 A can be generated according to the material, size, shape, etc. of the flash 4 to be melted and removed. Needless to say, with an increase in the arc current, the amount of burr to be melted and removed within a predetermined period increases. If desired, as the melting and removal of the burr proceed, the voltage to be applied across the electrode material 6 and the flash 4 may be varied to change the magnitude of the arc current flowing between them. For example, in the case of a burr whose width increases progressively from its end to base as is the case with the flash 4 shown in FIG. 1, the magnitude of the arc current may be progressively increased as the melting and removal of the burr proceed. Furthermore, as will be described in detail hereinbelow, the arc current can be reduced toward the end of the burr removing operation by the automatic heat control system for melting only the flash 4 without impairing the appearance of the product 2.

The power source 8 for generating the arc 10 between the electrode material 6 and the flash 4 by applying a voltage across them may be a power source used in the field of arc welding, for example a conventional DC power source equipped with a high frequency generator.

The magnetic field which is necessary for generating an electromagnetic force to drive the arc 10 along the flash 4 can be formed by any desired method. For example, it can be formed by providing an electromagnetic coil or permanent magnet above and below the electrode material 6 and the flash 4, or by using the electrodes themselves as permanent magnets. The arc 10 can also be driven by utilizing a magnetic field which is induced around the electrode material 6 owing to the current flowing through the electrode material 6. In the embodiment shown in FIGS. 1 and 2, the electrode material 6 is a permanent magnet made of a ferromagnetic material having magnetism both at its top and bottom surfaces. The arc 10 is driven along the flash 4 by utilizing both a magnetic field formed by this permanent magnet and a magnetic field induced by the current flowing through the electrode material 6.

Experiments of the present inventors have shown that when a magnetic field of 50 to 500 gauss formed which crosses an arc of 100 to 700 A substantially at right angles to it, the arc is driven at a speed of 20 to 70 m/sec., and when a magnetic field of 300 to 1,000 gauss crossing an arc of about 1000 A substantially at right angles to it, the arc is driven at a speed of 200 to 300 m/sec.

It is important that during the melting and removing of the flash 4 by the arc 10, the melting of the other part of the product 2 should be prevented to avoid the impairment of the appearance of the product 2. This can be achieved, for example, by stopping the generation of arc 10 between the electrode material 6 and the flash 4 at a suitable time (namely, by properly adjusting the time spent for melting and removing the flash by the arc 10); or by adjusting the distance between the electrode material 6 and the product 2 such that when substantially all the flash 4 has been removed, the distance between the electrode material 6 and the product 2 no longer permits the continued generation of arc.

The burr melting time may be predetermined based on experiment, but can also be automatically controlled by detecting a variation in voltage between the electrode material 6 and the flash 4. As is well known, when the arc length changes, the voltage between the electrodes changes correspondingly, and as the arc length increases, the voltage between the electrodes increases. Accordingly, when the flash 4 is removed and the distance between the electrode material 6 and the flash 4 increases, the length of arc 10 between the electrode material 6 and the flash 4 increases, and correspondingly, the voltage between the electrode material 6 and the flash 4 becomes higher. The extent of removing the flash 4 can therefore be determined by detecting a change in voltage between the electrode material 6 and the flash 4. When the substantially complete removal of the flash 4 is detected, the generation of arc 10 can be terminated by automatically stopping the application of voltage across the electrode material 6 and the flash 4 in accordance with the detection. Thus, the flash 4 can be melted and removed satisfactorily without substantially impairing the appearance of the product 2. In this automatic control, the extent of removing the flash 4 can be made more easily detectable by the arc voltage at a time near the end of the burr removing operation thereby to decrease the arc current and to slow down the speed of removing the flash 4.

When the burr 4 is to be melted and removed by forming the arc 10 between the electrode material 6 and the flash 4 and driving the arc 10 along the burr 4, the removal of the flash 4 is preferably achieved more effectively by passing a suitable amount (for example, 0.5 to 100 liters/minute) of a gas through a space between the electrode material 6 and the flash 4 as shown by arrow 16 in FIG. 1 and blowing off the molten flash by the action of the gas stream. When a gas having a low ionization voltage, such as argon, is used as the gas, an additional advantage can be obtained in that the arc 10 between the electrode material 6 and the flash 4 can be maintained stable. When oxygen is mixed with the gas and the product 2 is such a material as iron or steel, an additional advantage can be obtained in that the flash 4 burns by the supplied oxygen to generate the heat of the combustion reaction which in turn promotes the melting of the flash 4.

Figure 3:
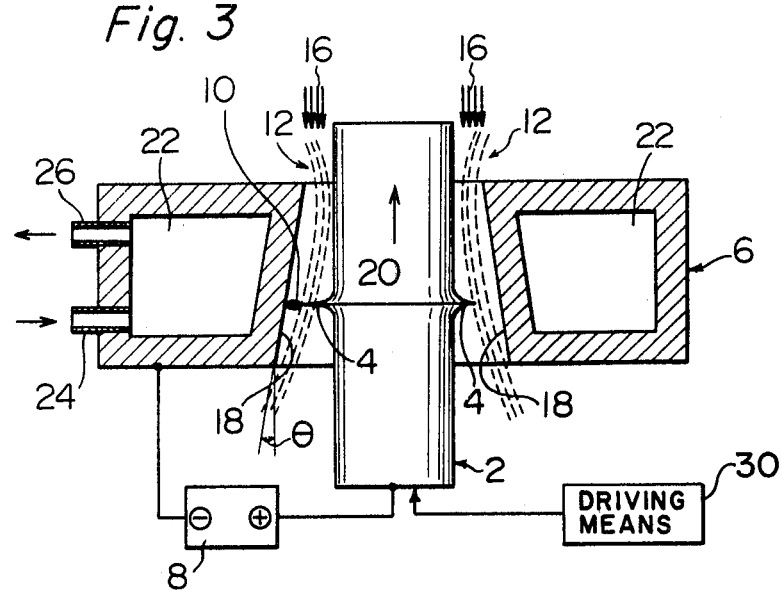
FIG. 3 is a simplified sectional view showing a second embodiment of the burr removing apparatus in accordance with the present invention.
Figure 4:
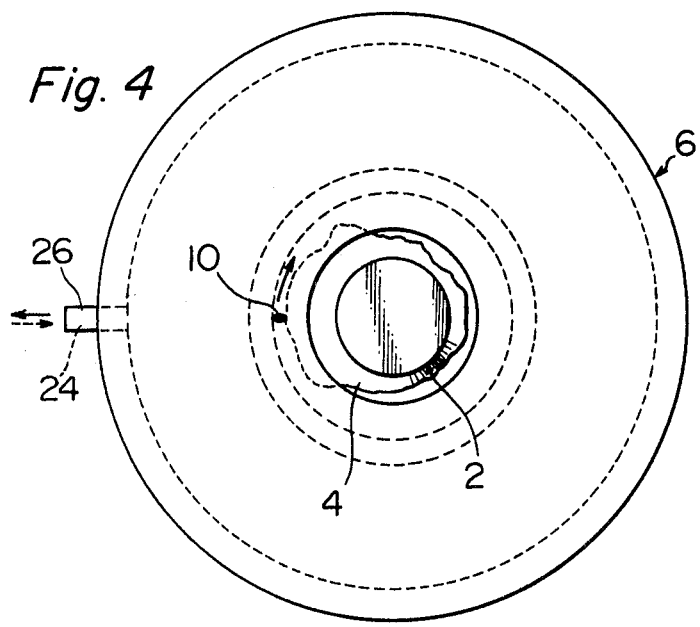
FIG. 4 is a simplified top plan of the embodiment shown in FIG. 3.

Referring to FIGS. 3 and 4, a modified embodiment of the present invention is described. In this modification, the electrode material 6 has a surface 18 inclined by an angle $\theta$ to the direction of right angles to the direction of driving the arc 10 formed between the electrode material 6 and the flash 4. The direction at right angles to the arc driving direction is the vertical direction in FIG. 3, and the direction perpendicular to the paper surface of FIG. 4. The product 2 having burr 4 is moved by conventional moving means 30 in a direction (shown by arrow 20 in FIG. 3) at right angles to the direction of driving the arc 10 so that the distance between the burr 4 of the product 2 and the surface 18 of the electrode material 6 decreases progressively.

In FIGS. 3 and 4, the burr 4 to be melted is an annular flash extending along the periphery of the weld joint of cylindrical metallic product 2, and the electrode material 6 is an annular material surrounding the flash 4. The electrode material 6 has a frustoconical surface 18 having an inclination angle $\theta$ (e.g., 25°). When in the embodiment shown in FIGS. 3 and 4, voltage is applied across the electrode material 6 and the flash 4 through the power source 8 and the product is moved in the direction of arrow 20, the generation of arc 10 between the electrode material 6 and the most projecting part of the flash 4 begins at a time when the distance between them attains such a magnitude that permits arc generation. The arc 10 is driven in the direction of arrow 14 along the flash 4 by the action of a magnetic field having a magnetic flux flow 12 which crosses the arc 10. At a part where the protrusion of the flash 4 is relatively short, arc 10 is not formed. Accordingly, the flash 4 is melted and removed by undergoing the action of the arc 10 progressively beginning with its most protruding part. As the flash 4 is successively melted and removed beginning with its most protruding part, the protruding length of the remaining flash becomes progressively shorter. However, since the product 2 is correspondingly moved gradually in the direction of arrow 20, the distance between the most protruding part of the remaining flash 4 and the inclined surface 18 of the electrode material 6 can be maintained nearly constant. The distance between the upper end of the inclined surface 18 which is closest to the product 2 and the surface of the product 2 is adjusted to a length that does not permit arc generation unless the flash 4 remains. Accordingly, while the product 2 is moved in the direction of arrow 20 and the weld joint is moved from the low to the upper end of the electrode material 6, the flash 4 of the product 2 is progressively melted and removed beginning with its most protruding part. By the time the weld joint of the product 2 passes the upper end of the electrode material 6, substantially all of the flash 4 has been melted and removed without substantially impairing the appearance of the product 2. Preferably, as stated hereinabove, a suitable gas designated by arrow 16 is passed between the electrode material 6 and the flash 4 during the melting and removing of the flash 4.

The speed of movement of the product 2 in the direction of arrow 20 depends upon the material constituting the flash 4 to be removed, its size and shape, etc., but may, for example, be about 0.2 to 6.0 m/min. If desired, it is possible to control the movement of the product 2 in the direction of arrow 20 on the basis of the detection of the length of arc 10 generated between the electrode material 6 and the flash 4, so that the length of arc 10 is made substantially uniform throughout the burr melting and removing operation. Of course, the electrode material 6 may be moved in a direction opposite to the arrow 20 by means (not shown) similar to means D, instead of moving the product 2 in the direction of arrow 20.

In the modified embodiment shown in FIGS. 3 and 4, a channel 22 through which to circulate a cooling medium is provided in the electrode material 6. A suitable cooling medium such as cooling water is circulated from an inlet to an outlet 26 through the circulating channel 22, thereby to cool the electrode material 6. Overheating of the electrode material 6 can be prevented by cooling it with the cooling medium circulated through the channel 22. When the surface 18 of the electrode material 6 is at a relatively high temperature, the molten flash which has been blown off by the gas stream is likely to adhere to the surface 18. This adhesion can be prevented by cooling the electrode material 6.

The following Examples illustrate the present invention more specifically.

EXAMPLE 1

An annular fin having an average thickness of 0.5 mm and an average protruding length of 10 mm which had been produced on the peripheral surface of a cylindrical product of green sand mold cast iron with a diameter of 150 mm was processed under the following conditions by an apparatus of the type shown in FIGS. 1 and 2. In about 3 seconds, substantially all of the fin could be melted and removed without substantially impairing the appearance of the product.

DC arc current: 200 A
Intensity of the magnetic field: about 3,000 AT/m
Flow rate of the gas (90% Ar+10% $O_2$): 5 liters/min.

EXAMPLE 2

An annular fin having an average thickness of 1.0 mm and an average protruding length of 10 mm which had been produced on the peripheral surface of a cylindrical product of $CO_2$ gas mold cast iron with a diameter of 150 mm was processed under the following conditions by an apparatus of the type shown in FIGS. 1 and 2. In about 4 seconds, substantially all of the fin could be melted and removed without substantially impairing the appearance of the product.

DC arc current: 300 A
Intensity of the magnetic field: about 5,000 AT/m
Flow rate of the gas (90% Ar+10% $O_2$): 5 liters/min.

EXAMPLE 3

An annular fin having an average thickness of 2.0 mm and an average protruding length of 15 mm which had been produced on the peripheral surface of a cylindrical product of green sand mold cast steel with a diameter of 150 mm was processed under the following conditions by an apparatus of the type shown in FIGS. 1 and 2. In about 7 seconds, substantially all of the fin could be melted and removed without substantially impairing the appearance of the product.

DC arc current: 500 A
Intensity of the magnetic field: about 7,000 AT/m
Flow rate of the gas (90% Ar + 10% O₂): 5 liters/min.

EXAMPLE 4

An annular fin having an average thickness of 1.0 mm, an average protruding length of 4.0 mm and a maximum protruding length of 12 mm which had been produced on the peripheral surface of a cylindrical product of green sand mold cast steel with a diameter of 50 mm was processed under the following conditions by an apparatus of the type shown in FIGS. 3 and 4 and equipped with an electrode material having a thickness of 15 mm, a diameter, at the exit of the product, of 56 mm and an inclination angle $\theta$ of 25°. Substantially all of the fin could be melted and removed without substantially impairing the appearance of the product.

DC arc current: 2,000 A
Flow rate of air: 30 liters/min.
Speed of moving the product: 1.5 m/min.
Intensity of the magnetic field: about 7,000 AT/m.

What we claim is:

1. A method for melting and removing a burr which is a thin ridge or area of roughness formed on a product fabricated from metal stock without substantially damaging the product, which comprises generating an arc with enough intensity to melt said burr between the burr as one electrode and another electrode composed of an electrode material extending along, and spaced from, the burr; forming a magnetic field having a magnetic flux flow crossing the arc, thereby to drive the arc along the burr by an electro-magnetic force and directing a stream of gas in the space between the burr and the opposing electrode so that the gas stream impinges against the burr with sufficient velocity to blow off the molten burr.

2. The method of claim 1 wherein a direct current arc is generated between the electrodes by applying a direct current voltage across the electrodes.

3. The method of claim 2 wherein the burr is a positive electrode and the electrode material is a negative electrode.

4. The method of claim 1 wherein the electrode material is made of a permanent magnet which serves to at least partly drive the arc along the burr, and the magnetic field is formed by the permanent magnet.

5. The method of claim 1, wherein the gas is low in ionization voltage in that it is readily ionized by the heat of the arc.

6. The method of claim 1 wherein the gas is an oxygen-containing gas.

7. The method of claim 1 wherein the electrode material has a surface inclined at a certain angle to the direction at right angles to the direction of driving the arc; and wherein the electrode material and the product are moved relative to each other in the direction at right angles to the arc driving direction so that the distance between the burr of the product and the surface of the electrode material decreases progressively.

8. The method of claim 1 wherein the gas velocity of the gas stream flowing between the burr and opposing electrode is 0.5 to 100 liters/minute.

9. The method of claim 8 wherein the gas is argon.

10. The method claim 8 wherein the gas is a mixture of argon and oxygen.

11. An apparatus for melting and removing a burr which is a thin ridge or area of roughness formed on a product fabricated from metal stock without substantially damaging the product, comprising an electrode material extending along, and spaced from, the burr; a power source for applying a voltage across the burr and the electrode material to generate an arc with enough intensity to melt said burr between them; means for forming a magnetic field having a magnetic flux flow crossing the arc, thereby to drive the arc along the burr by an electromagnetic force and means for directing a stream of gas in the space between the burr and the opposing electrode so that the gas stream impinges against the burr with sufficient velocity to blow off the molten burr.

12. The apparatus of claim 11 wherein the power source is a direct current power source.

13. The apparatus of claim 12 wherein the positive side of the power source is connected to the burr, and its negative side is connected to the electrode material.

14. The apparatus of claim 11 which further comprises an electrode cooling means including a cooling medium circulating channel formed in the electrode material.

15. The apparatus of claim 11 wherein the electrode material has a surface inclined at a certain angle to the direction at right angles to the direction of driving the arc, and wherein a means is provided which moves the electrode material and the product relative to each other in the direction at right angles to the direction of arc driving so that the space between the burr of the product and the surface of the electrode material decreases progressively.

16. The apparatus of claim 11 wherein the burr is an endless burr extending along the peripheral surface of the product, and the electrode material is an endless material surrounding the burr.

17. The apparatus of claim 16 wherein the burr is an annular burr present on the surface of a cylindrical product, and the electrode material is an annular material surrounding the burr.

* * * * *